United States Patent [19]

Wallen

[11] 4,030,063

[45] June 14, 1977

[54] ULTRA LOW FREQUENCY ACOUSTIC GENERATOR

[75] Inventor: Albert E. Wallen, Winston-Salem, N.C.

[73] Assignee: The United States of America as represented by the Secretary of the Navy, Washington, D.C.

[22] Filed: July 28, 1976

[21] Appl. No.: 709,151

[52] U.S. Cl. .......................... 340/8 R; 116/137 A; 181/120; 340/12 R

[51] Int. Cl.[2] ........................................ H04B 13/00

[58] Field of Search ............... 340/8 R, 12 R, 8 PC; 181/119, 120, 404, 405; 91/318; 116/137 A, 137 R, 26, 27

[56] References Cited

UNITED STATES PATENTS

| | | | |
|---|---|---|---|
| 1,952,690 | 3/1934 | Strom, Sr. | 91/318 X |
| 3,105,460 | 10/1963 | Bouyoucos | 116/137 A |
| 3,143,999 | 8/1964 | Bouyoucos | 340/8 R |
| 3,212,473 | 10/1965 | Bouyoucos | 116/137 A |
| 3,516,052 | 6/1970 | Bouyoucos | 340/12 R |
| 3,803,544 | 4/1974 | Wallen et al. | 340/12 R |

*Primary Examiner*—Harold Tudor

[57] ABSTRACT

An underwater, ultra low frequency acoustic signal projector utilizes a pneumatically powered signal generator wherein slide and poppet valves cooperate to effect pressure excursions on a piston connected to a water contacting signal generating piston.

The generator is constantly pneumatically referenced to ambient hydrostatic pressures by a pressure equilibrium control system. A compressor recycles generator exhaust to provide substantially bubble free operation.

5 Claims, 3 Drawing Figures

ULTRA LOW FREQUENCY ACOUSTIC GENERATOR

BACKGROUND OF THE INVENTION

This invention relates generally to balanced pressure underwater acoustic projectors, and more particularly to a pneumatically powered, ultra low frequency acoustic signal generator for submerged use.

Underwater acoustic energy projectors find use in a variety of applications, both military and scientific. Such projectors generally comprise an acoustic signal generator housed in a towed body and are required to operate at great depths of submergence. Moreover, they require considerable power to deliver the desired acoustical energy into the water at those depths. In order to obtain maximum efficiency of operation of the signal generator, it has been the practice to provide a pressure system that will maintain an equilibrium between the signal generator and the ambient hydrostatic pressure irrespective of changes in operating depth throughout a considerable range of depths. A particularly effective pressure equilibrium system is disclosed in U.S. Pat. No. 3,803,544 to Albert E. Wallen, et al.

The acoustic signal generators employed in such towed projectors have generally been of the electroacoustic type utilizing piezoelectric electromagnetic transducers. These have achieved notable success through a wide range of frequencies, although size and structural considerations renders them less satisfactory as frequencies decrease and as hydrostatic pressures increase.

SUMMARY OF THE INVENTION

With the foregoing in mind, it is a principal object to provide an ultra low frequency (5 to 100 Hz) acoustic signal generator capable of efficient operation at water depths as great as 2,000 feet, or more.

Another important object is the provision of a novel pneumatically powered acoustic signal generator.

As another object, the invention aims to provide an ultra low frequency acoustic signal generator which can be varied in frequency and amplitude of operation.

Yet another object is the provision of an acoustic signal generator of the foregoing character in combination with pressure equilibrium means so as to be substantially stable in selected frequency and amplitude irrespective of changes in depth of operation.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
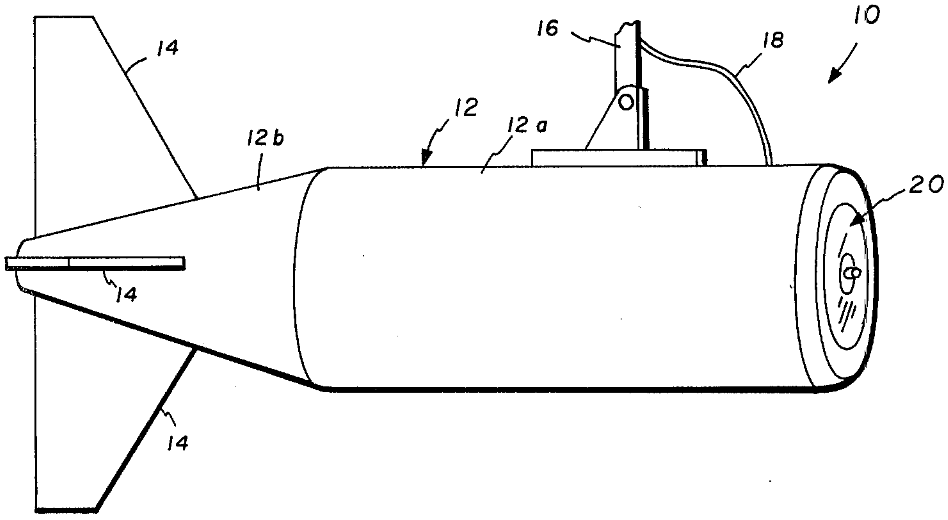
FIG. 1 is a perspective view of a towed body acoustic projector including an ultra-low frequency acoustical signal generator embodying the invention.

Referring to FIG. 1, there is illustrated a deep submergence towed body 10 incorporating an ultra-low frequency acoustic signal generator according to this invention. Briefly, the body 10 comprises a hull 12 having a cylindrical section 12*a*, and a tapered tail section 12*b* on which are mounted suitable stabilizing fins 14. The body is adapted to be towed at an assigned depth by means of a cable 16 leading from a tow vessel, and receives electrical power and control signals via a conductor cable 18 for purposes which will presently be made apparent.

Housed within the hull 12 is the inventive acoustic signal generator, about to be described in detail, which generator comprises a diaphragm type piston 20 that is presented at the nose of the towed body 10 and is substantially the diameter of the hull section 12*a*. The piston 20 is caused to move in and out at the desired basic signal frequency, and through a selected amplitude, both of which are maintained irrespective of changes in ambient pressures, through the constructions combinations, and arrangements of parts described in detail as this specification proceeds.

Figure 2:
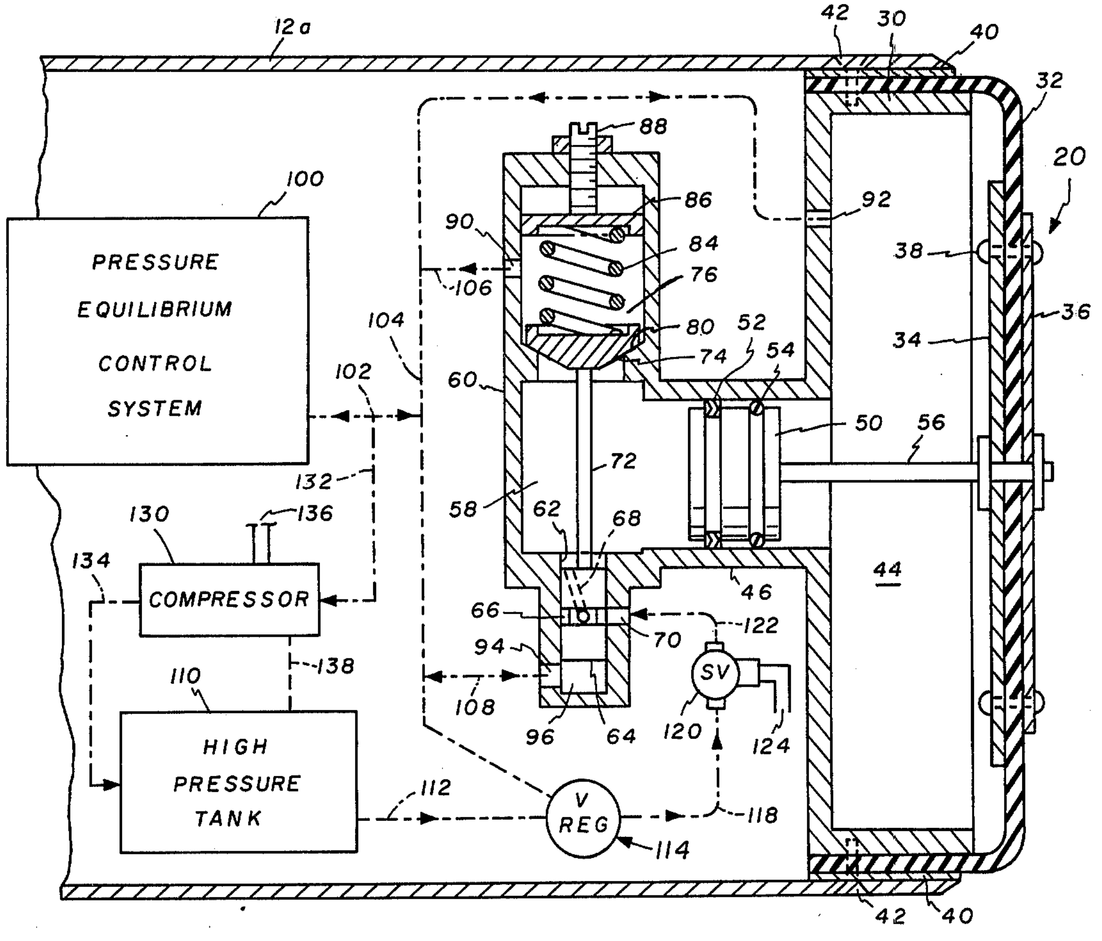
FIG. 2 is a diagrammatic illustration of the signal generator of the invention.

Referring now to FIG. 2, the ultra-low frequency acoustic signal generator comprises a large diameter cylinder 30 formed of light weight metal or other rigid material. Fixed to the cylinder 30 is the mentioned piston 20 which comprises a flexible rubber cup-shaped diaphragm member 32, the central area of which is sandwiched between circular piston plates 34 and 36. The plates 34 and 36 are conveniently fixed together in clamping relation to the diaphragm member 32 by rivets 38, or other suitable fasteners. The peripheral portion of the diaphragm member 32 is clamped about the outside of cylinder 30, as by a band 40 and the cylinder and assembled diaphragm are fixed in the open end of the hull section 12*a*, as by screws 42.

The piston 20 and cylinder 30 define a chamber 44 which communicates with a smaller diameter cylinder 46 that is conveniently axially aligned with the cylinder 30. Disposed for reciprocation within cylinder 46 is a piston 40 having suitable annular piston rings or seals 52, 54. The piston 50 is directly connected to the piston 20 by a piston rod 56 so that movements of the two pistons are in unison.

The cylinder 46, in turn, opens into a chamber 58 of a valve body 60. Reciprocably disposed in a bore 62, communicating with chamber 60, is a spool type slide valve 64 having a groove 66 and passage 68 adapted to cooperate with a regulated high pressure inlet port 70 in the body 60.

The slide valve 64 is directly connected by a stem 72 to a poppet valve 74, reciprocable in a chamber 76 of body 60 and adapted to seat against an annular valve seat 80 between chambers 76 and 58. It should be noted at this point that the area of the poppet valve 74 exposed to chamber 58 exceeds the area of the slide valve 64 exposed thereto.

The poppet valve 74 is normally urged against the seat 80 by a compression spring 84 acting between that valve and an adjustable spring seat 86. The spring seat 86 is selectively positionable in chamber 76 by an adjusting screw 88 for the purpose of selectively varying the amplitude of the acoustic signal to be generated.

A port 90 opening into chamber 76, a port 92 opening into chamber 44 of cylinder 30, and a port 94 opening into a chamber 96 defined in bore 62 by the slide valve 64, are all placed in communication with a pressure equilibrium control system 100 through suitable fluid pressure conduits represented by dot and dash lines. Thus, fluid pressure flow to and from the control system 100 may be traced from that system via conduits 102 and 104 to port 92, and additionally via conduits 106 and 108 to ports 90 and 94, respectively.

The pressure equilibrium control system 100 may be of any known construction capable of maintaining pressure in conduit 102 substantially equal to ambient pressures irrespective of increases or decreases in depth of operation of the projector 10. Advantageously, the system 100 is of the type described in U.S. Pat. No. 3,803,544 to A. E. Wallen and P. L. Whitehead.

A supply of high pressure fluid, e.g., air, is contained in a high pressure tank 110 as a pneumatic power source for the acoustic signal generator. The tank 110 is connected via a conduit 112 to the high pressure inlet of an adjustable pressure regulating valve, generally indicated at 114 and later described in greater detail with reference to FIG. 3, that serves as a signal frequency determining element. The regulated pressure outlet of valve 114 is connected via a conduit 118, a solenoid valve 120, and conduit 122 to the supply port 70 in valve body 60. The solenoid valve is adapted to be energized by remote control through conductors 124 which may form part of cable 18.

In order to extend the period of time through which the signal generator can function, and to minimize loss of air to the surrounding water, an electrically powered compressor 130 is provided having its intake connected by a conduit 132 to conduit 102, and its outlet connected by a conduit 134 to the high pressure tank 110. The compressor may be powered by electric current supplied via conductors 136, conveniently forming part of cable 18. Control of the compressor 130 is by pressure-static switch that senses the pressure in tank 110, the connection therebetween being indicated at 138. The equilibrium control system 100 and the compressor cooperate to substantially eliminate the formation of acoustic energy absorbing bubbles in the water around the projector 10.

Figure 3:
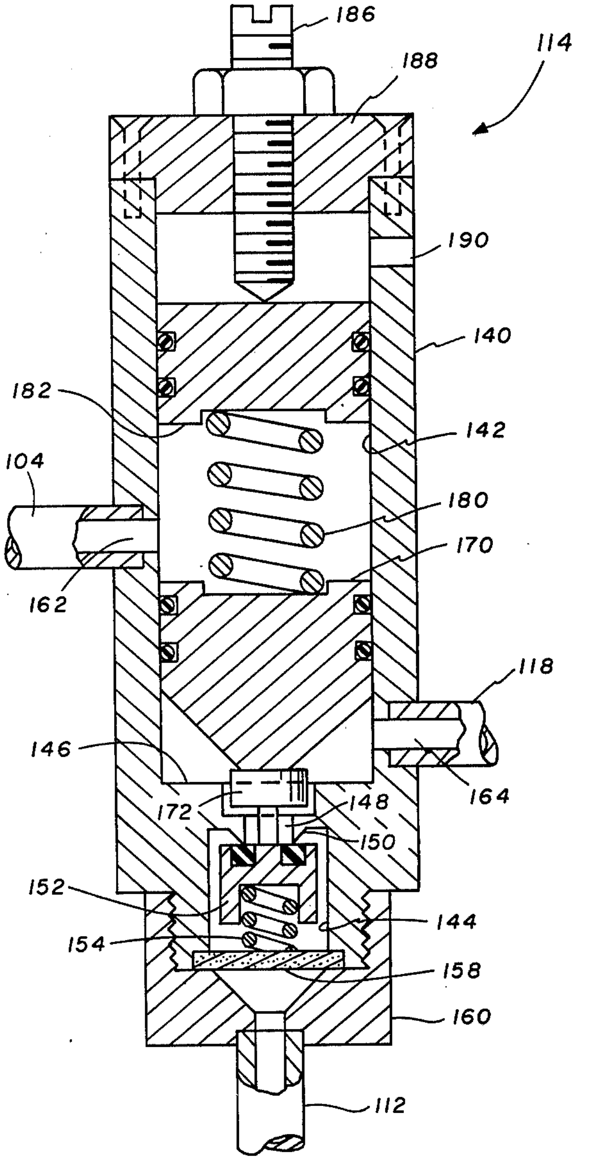
FIG. 3 is a sectional view of a frequency controlling regulator valve forming part of the signal generator.

Referring now to FIG. 3, the frequency controlling pressure regulating valve 114 will be described in more detail. The valve 114 comprises a body 140 having a cylindrical bore 142 separated from an inlet bore 144 by a wall portion 146. A stepped passage 148 communicates between the inlet bore 144 and the cylindrical bore 142 and is surrounded by an annular valve seat 150. A valve member 152 is normally biased into engagement with the seat 150 by a compression spring 154. The spring 154 reacts against a sintered metal filter 158 retained by a suitable threaded coupling 160 that connects the high pressure supply line 112 to the valve body 140.

Disposed in the cylindrical bore 142, between a reference pressure port 162 connected to conduit 104 and an outlet port 164 connected to conduit 118, is an actuating piston 170. The piston 179 bears against a plunger 172 having a stem that is adapted to unseat the valve member 152 from its seat 150 when pressed by that piston with sufficient force to overcome the combined resistance of spring 154 and the high air pressure in bore 144. Acting on the piston 170, in addition to the pressure supplied by conduit 104, is a compression spring 180 that reacts against an adjustable spring seat 182 in the bore 142. The spring seat 182 is positionable by a screw 186 threaded through a closure member 188. The space between the seat 182 and the closure member 188 is conveniently vented by a port 190.

By means of the screw 186, the valve 114 can be adjusted to maintain selected pressure differential between the pressure in conduit 118 and the ambient water pressure as represented by the pressure in conduit 104 from the pressure equilibrium control system.

MODE OF OPERATION

Consider the high pressure tank 110 to be charged with air, nitrogen, or other pneumatic fluid to a pressure considerably in excess of the water pressures to be encountered by the projector 10. Also consider the valve 120 to be in a closed condition. As the projector 10 is lowered in the water to its operating depth, the pressure equilibrium control system automatically adjusts the pressure in conduits 102, 106, and in chambers 44, 58, 76 and 96 to equal the ambient water pressure. Accordingly, the pistons 20 and 50 have equal pressures on all sides thereof and remain stationary. Poppet valve 74 will be held on its seat by spring 84, and slide valve 64 will be located with groove 66 aligned with the inlet port 70.

The pressure reducing regulator valve 114 will have pneumatic fluid pressure equal to ambient water pressure provided via conduit 104 and port 162 to act on piston 170 in addition to the force of spring 180. The piston 170 bears against plunger 172, the stem of which will unseat the valve member 152 to permit pneumatic fluid from the high pressure tank 110 to pass through passage 148 into bore 142 so as to act against piston 170 in a direction tending to compress spring 180. When the pressure in port 164 and conduit 118 reaches a predetermined differential over ambient water pressure, the piston 170 will have been moved against spring 180 sufficiently to allow spring 154 and the high pressure fluid to close valve member 152. Valve 114 continuously operates in the foregoing manner as necessary to reduce the high pressure fluid from tank 110 and maintain in conduit 118 a desired predetermined pressure differential relative to ambient water pressure.

Now, if the solenoid valve 120 is energized to an open condition, pneumatic fluid, reduced in pressure by regulator valve 114, will be admitted through port 70, groove 66, and passage 68 into the chamber 58. The reduced pressure pneumatic fluid entering chamber 58, while at lower pressure than in tank 110, is of sufficiently high pressure to cause piston 50 to move piston 20 outwardly against the ambient water pressure. When the pressure in chamber 58 acting on poppet valve 74 is sufficient to overcome the force of spring 84, that valve moves away from its seat and, because of its connection by rod 72 to the slide valve 64, the latter is moved to interrupt flow through inlet port 70. Since chamber 76 is maintained by the equilibrium control system 100 at a pressure substantially equal to ambient pressure, the result is a rapid or sudden drop in pressure in chamber 58, thereby allowing ambient water presure to move pistons 20 and 50 toward the respective chambers 44 and 58.

When the pressure in chamber 58 has fallen substantially to the equilibrium pressure, valve 74 closes, valve 64 opens port 70, and regulated high pressure pneumatic fluid is again admitted to the chamber 58 to act on piston 50. It will be recognized that the cycle will be repeated in an oscillatory manner at a frequency determined in part by the pressure differential between the regulated high pressure output of valve 114 and the ambient or equilibrium pressure. It will also be recognized that the stroke of the pistons 50 and 20, and hence the amplitude of the water displacement by the latter, are a function of the tension of spring 84. Accordingly, the described signal generating mechanism produces an oscillating or cyclic reciprocation of piston 20 that produces an acoustic signal, in the surrounding water, having a frequency and amplitude that is selectable by adjustment of adjusting screws 186 and 88. The frequency of operation may be ultra low, that is in the range of say 5 to 100 Hz, and yet very efficient in the use of on-board stored energy. The oscillations may be characterized as abrupt, more or less squarewave like, and broadband. By providing suitable restrictions in flow ports 70 and 90, the oscillations may, if desired, be made more sinusoidal.

Pneumatic flow exhausted through port 90 is normally pumped by the compressor 130 back into the high pressure tank 110. If a condition exists such that the compressor 130 cannot keep up with the signal generator exhaust, the surplus air will automatically be routed to the accumulator of the equilibrium control system for storage at ambient pressure. If the condition is not corrected, and a positive pressure (over ambient) develops in the accumulator, the signal generator oscillations will cease automatically, because of loss of the required differential for operation, until the compressor is able to restore the required pressure balance. Normally, the compressor will cycle on and off as necessary to keep the necessary high pressure in the tank 100, and to permit the equilibrium control system to maintain pressure equilibrium, as earlier described, relative to ambient pressures.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. An underwater acoustic signal generator comprising in combination:

a source of pneumatic fluid at a high pressure relative to ambient water pressure;

pressure equilibrium control means for providing pneumatic fluid at a reference pressure that is maintained substantially equal to ambient water pressure;

pressure reducing valve means, connected to said source and responsive to said reference pressure, for providing pneumatic fluid at a regulated pressure that is maintained at a predetermined differential over said reference pressure;

body means defining first and second chambers and a cylinder interconnecting said chambers;

pneumatic oscillator means, connected to said pressure reducing valve means to receive penumatic fluid at said regulated pressure and connected to said equilibrium control means so as to exhaust at said reference pressure, for effecting substantially square wave pneumatic pressure excursions in said second chamber at a predetermined frequency;

means for connecting the pressure equilibrium control means to said first chamber to provide pneumatic fluid at said reference pressure in said first chamber;

a first piston having one side exposed to said reference pressure in said first chamber and the other side exposed to ambient water pressures; and a second piston disposed in said cylinder and connected directly to said first piston, said second piston being exposed on one side to pneumatic fluid at said reference pressure in said first chamber and on the other side to said pneumatic pressure excursions in said second chamber, whereby the effect of said pressure excursions on said second piston are transmitted through said first piston to said ambient water.

2. An acoustic signal generator as defined in claim 1, and wherein said pneumatic oscillator comprises:

a slide valve, movable between first and second operative positions for alternatively admitting and interrupting flow of pneumatic fluid from said pressure reducing valve means into said second chamber;

a third chamber defined by said body means and being connected to said equilibrium control means so as to be maintained substantially at said reference pressure;

a first valve seat surrounding a first flow passage between said second and third chambers;

a poppet valve disposed in said third chamber for reciprocation to and from said first valve seat;

adjustable first load spring means urging said poppet valve toward said first valve seat;

said poppet valve being directly connected to said slide valve for simultaneous reciprocation such that when said poppet valve is moved toward said first valve seat said slide valve moves toward said first operative position and when said poppet valve moves away from said first valve seat said slide valve moves toward said second operative position;

said adjustable first load spring means being variable to select the amplitude of said pressures excursions.

3. An acoustic signal generator as defined in claim 2 and wherein said pressure reducing valve means comprises:

a valve body defining an inlet chamber connected to receive pneumatic fluid from said source at said high pressure, a cylindrical bore, a second flow passage therebetween, and a second valve seat surrounding said flow passage in said inlet chamber;

said valve body having an outlet port communicating with the end of said cylindrical bore adjacent said second flow passage and a reference pressure port communicating with said cylindrical bore at a location remote from said outlet port and connected to said pressure equilibrium control means;

a valve means disposed in said inlet chamber and a valve spring urging said valve member against said second valve seat;

an actuating piston disposed in said bore between said outlet and reference ports so as to be subjected on one side to said reference pressure and on the other side to said regulated pressure;

an actuating plunger extending between said actuating piston and said valve member for controlling unseating and seating of said valve member in response to movements of said actuating piston; and adjustable second load spring means, urging said actuating piston toward said valve member, for establishing said predetermined pressure differential and selecting said predetermined frequency.

4. An underwater acoustic signal generator as defined in claim 3, and further comprising:

compressor means, connected to receive said exhausted pnuematic fluid, for return thereof to said source at an elevated pressure.

5. An acoustic signal generator as defined in claim 1 and wherein said pressure reducing valve means comprises:

a valve body defining an inlet chamber connected to receive pneumatic fluid from said source at said high pressure, a cylindrical bore, a flow passage therebetween, and a valve seat surrounding said flow passage in said inlet chamber;

said valve body having an outlet port communicating with the end of said cylindrical bore adjacent said flow passage and a reference pressure port communicating with said cylindrical bore at a location remote from said outlet port and connected to said pressure equilibrium control means;

a valve member disposed in said inlet chamber and a valve spring urging said valve member against said valve seat;

an actuating piston disposed in said bore between said outlet and reference ports so as to be subjected on one side to said reference pressure and on the other side to said regulated pressure;

an actuating plunger extending between said actuating piston and said valve member for controlling unseating and seating of said valve member in response to movements of said actuating piston; and adjustable second load spring means, urging said actuating piston toward said valve member, for establishing said predetermined pressure differential and selecting said predetermined frequency.

* * * * *